INVENTOR.
Robert Edward Burton
BY
Attorneys

United States Patent Office 3,407,935
Patented Oct. 29, 1968

3,407,935
LIQUID DISTRIBUTION MEANS IN APPARATUS
FOR TREATING LIQUID WASTES
Robert Edward Burton, 475 E. San Francisco Ave.,
P.O. Box 577, Willits, Calif. 95490
Filed May 18, 1966, Ser. No. 551,165
4 Claims. (Cl. 210—151)

ABSTRACT OF THE DISCLOSURE

Apparatus for treating liquid wastes for uniformly and continuously distributing liquids over an area of appreciable dimension, such apparatus making use of a perforated rotary distribution device mounted on a tilt axis so as to have a high and a low side. The perforated surface of the distribution device carries a mass of bark fibers or like means to disrupt liquid flow so that liquid circulated to a point above the high side of the rotary distribution means is slowly spread over the rotating surface for discharge as a uniform rain of liquid below the device as it rotates.

---

This invention generally relates to the treatment of various liquid wastes, including raw and partially clarified sewage, municipal and commercial waste waters, and similar liquid wastes, and more particularly relates to an improved liquid distribution means and method useful in carrying out such treatment by which a more rapid and efficient treatment and other beneficial effects are obtained.

In my Patent 3,238,124, method and means are disclosed for treating waste waters such as sewage and other liquid systems by which separation and removal of colloidal and other organic solids is made possible simultaneously with aeration to reduce the biological oxygen demand of such waste liquids. The treating systems therein disclosed make use of aeration means in the form of hanging fiber sections composed preferably of strips of bark or bark fiber. These hanging fiber sections hang down into a fiber containing reservoir from which the waste liquid is continuously circulated onto the hanging fiber sections. Various means for circulating the waste liquids over the hanging fiber sections are disclosed.

In general, it is an object of the present invention to improve upon waste liquid treating systems of this type, particularly with respect to the means and method by which the waste liquids are circulated onto the hanging fiber sections.

It is another object of the invention to provide a means and method of the above type which functions to uniformly and continuously distribute waste liquids to said hanging fiber sections in the form of a rotating uniform rain of liquid.

Another object of the invention is to provide apparatus of the type described for uniformly and continuously distributing liquids over an area of appreciable size and dimension.

A further object of the invention is to provide a novel method for continuously distributing waste liquids in the manner described.

Additional objects and advantages of the invention will appear from the following description in which an illustrative embodiment has been set forth in detail in conjunction with the accompanying drawing.

Referring to the drawing.

Generally stated, the present invention relates to improvements in liquid distribution methods and means of the type described above and makes use of a rotary distribution member mounted for rotation about a tilt axis in such fashion that a portion thereof is always higher than remaining portions of the rotating member. The rotary distribution means is preferably constructed to provide a substantially planar perforated surface upon which is supported a mass of fibers or other suitable means to disrupt and retard the flow of liquid. Waste liquid undergoing treatment is discharged onto the rotary distribution unit in such fashion that a substantial body or weight of treating liquid continuously builds up adjacent the high point of rotation so that the treated liquid itself causes the rotation of the distribution unit. In a preferred embodiment, the rotary distribution means supports a layer of redwood bark fibers, in the form of individual fibers or strips of bark, arranged in random or haphazard manner to provide a substantial layer depth of the fibers on the perforated or porous rotary support. This general arrangement has been found to provide a continuous rotary distribution of waste liquid in a desired pattern similar to rain or rainfall.

Figure 1:
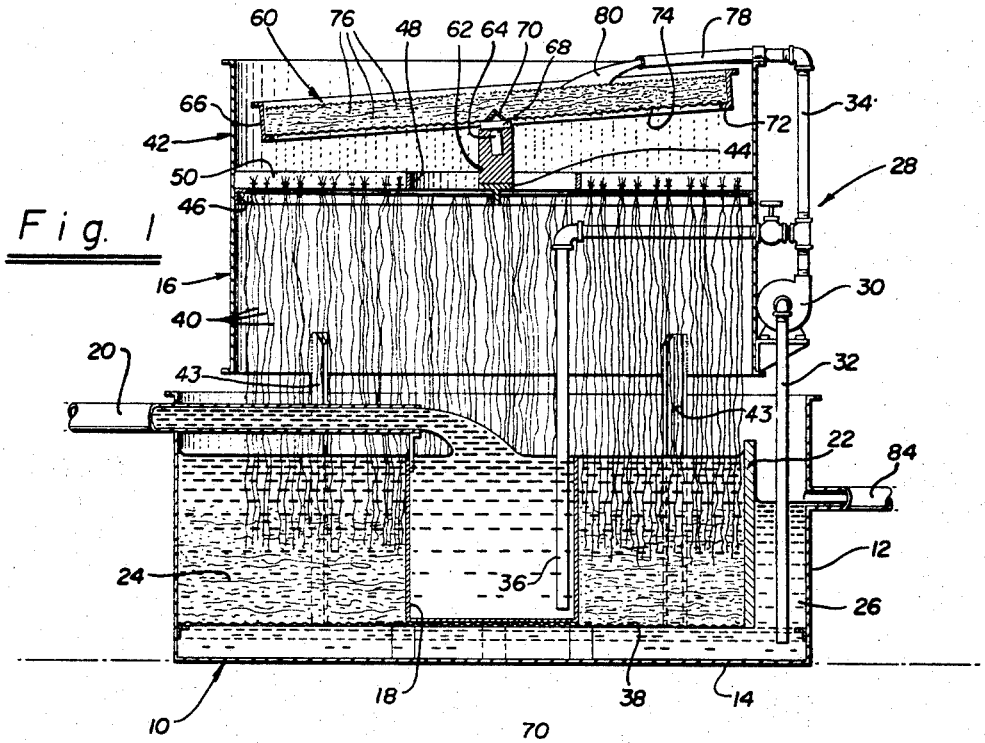
FIGURE 1 is a view in longitudinal section illustrating a liquid waste treatment system incorporating an improved liquid distribution means in accordance with the invention.

As illustrated in connection with the present invention, the liquid waste treating system includes a reservoir 10 which should be of a size to receive and easily process expected amounts of waste liquids fed to the system. The reservoir is formed by suitable side and bottom wall means 12 and 14 which provide an open top to permit the mounting of a hanging fiber section 16 so that the lower ends of the fibers are supported in spaced relation above the floor of the reservoir. In conjunction with the reservoir 10, I preferably provide an interior imperforate container 18 which facilitates the periodic removal of any organic impurities such as sand, rocks, or gravel which may get into the system. The interior container 18 also provides a means to receive the main flow of waste liquid introduced through the inlet conduit 20. Waste liquid introduced to the system through the conduit 20 overflows the side walls of the container 18, passing into the main reservoir formed by the tank 10. In conjunction with the reservoir 10 I additionally provide a barrier or screening means 22 which serves to separate or isolate a main pond or body of waste liquid 24 with respect to a zone of discharge 26 from which treated waste liquid is discharged from the system. A circulatory system 28 is also provided and includes a pump 30 with a suction leg 32, a main distribution leg 34, and an auxiliary distribution leg 36. As illustrated in FIGURE 1, the container 18 and barrier 22 are preferably supported on an expanded metal or open mesh framework 38 which separates the downstream leg 32 of the pump from the main body of liquid 24 within the reservoir.

As more specifically described in my Patent 3,328,124, the body of liquid 24 above the framework 38 preferably contains a dispersion of a profusion of substantially individualized bark fibers which have the capacity to attract colloidal solids and to remove the same from the circulating waste liquids.

Referring to FIGURE 1, the treated waste liquid is circulated by the pump 30 to a point above the hanger fiber section 16. The latter, which preferably comprises a profusion of specially processed bark strips 40 (i.e., redwood or like bark fibers) is suspended within a cylindrical housing 42 which, in turn, is supported above the reservoir 10 by a suitable support structure such as the legs 43. Extending crosswise of the housing 42 is a radial support structure for the hanging fiber section, comprising a cross beam 44, an outer channel ring 46, an inner ring 48, and a series of radial support members 50 extending between the inner and outer rings. The latter provide a convenient supporting framework upon which to suspend the individual bark strips 40 making up the hanging fiber section 16.

In accordance with the present invention, an improved rotary distribution means 60 is mounted in position above the hanging fiber section 16 to receive the waste liquid being recycled through the distribution line 34. As best illustrated in FIGURE 1, the distribution unit 60 is mounted on a central vertical support 62 carried by the cross member 44. The support 62 is provided with a bore or bearing surface which is inclined at a slight angle to receive a supporting stub shaft 64 for the rotary unit 60. The latter is generally constructed in the form of a shallow ring 66 which is mounted for rotation on the stub shaft 64 by means of the bearing plate 68 and cross members 70. The latter cooperate with a lower flange 72 on the ring 66 to provide a support for a perforated substantially planar bottom 74 of the rotary unit. By way of illustration, I have found that the bottom 74 can be satisfactorily formed of commercially available, three-quarter inch expanded metal, such construction providing a desired degree of porosity coupled with necessary structural strength.

As is apparent in FIGURE 1, the above described construction of the rotary unit 60 provides a shallow tray configuration having an open or perforated bottom. In accordance with my invention, this shallow rotary tray is substantially filled with a mass of flow disrupting fibers or strips 76 which are distributed over the perforated bottom 74 to provide a substantially uniform layer depth and consequent resistance to liquid flow through the distribution unit.

In conjunction with the rotary unit 60, I have found it desirable to employ a plurality of specially processed bark strips 76 composed of redwood or like bark fibers which have been processed in a manner similar to strips 40. In general, these bark strips comprise lengths of bark which have been subjected to longitudinal and transverse shear stresses designed to break down the fiber structure of the strips and to open the fiber structure without changing the overall configuration of the bark strips. Where redwood bark is used, the individual fibers are approximately 1 centimeter long with a thickness no greater than about 1 millimeter, the individual fibers clinging to each other to form hanks about 4 feet in length. Such processing serves to greatly enlarge the exposed surface area of the individual bark fibers in each strip, and thereby greatly multiply the bark surface exposed to waste liquids and air currents ciculating through the fiber section. As will hereinafter be explained, this construction permits thin films of waste liquid discharged on the rotary distribution unit 68 (and also on the hanging fiber section 16) to pass through the mass of bark fibers in such manner as to effectively aerate the circulating liquid.

Figure 2:
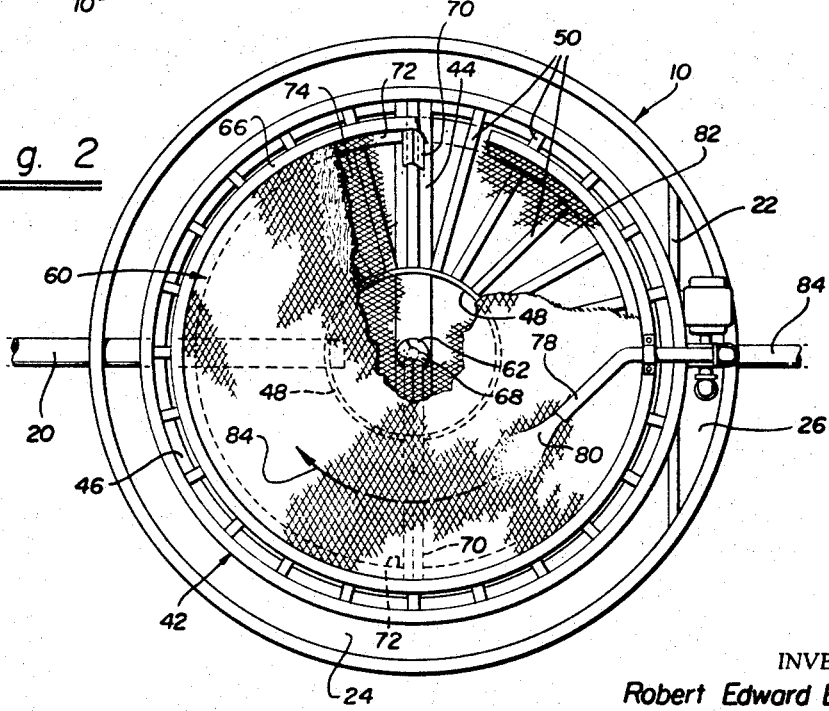
FIGURE 2 is a view in top plan of the apparatus shown in FIGURE 1.

Referring again to FIGURE 1, the mounting of the rotary distribution unit 68 for rotation about the tilt axis 64 insures that one side of the bark containing tray or receptacle 66 will always be higher than an opposite side. This arrangement of the rotating parts makes it possible to use the circulating waste liquid as a means to effect rotation of the distribution unit 60. Thus, as illustrated in FIGURE 2, the leg 34 of the distribution line can be provided with a discharge outlet 78 positioned to discharge the circulating waste liquid adjacent the high side of the rotary unit. Since it will take an appreciable time for the waste liquid to penetrate the layer of bark strips 76, the point 80 on the rotary unit (see FIGURE 2) represents an area of greater liquid content than remaining portions of the rotary unit, specifically at a point 82 equidistant from a center line through the high and low points of the rotary unit. It will be appreciated that the added weight of water at the point 80 coupled with the tilt of the rotary unit 60, will give a gravity effect which will tend to rotate the rotary unit in the direction of the arrow 84. Thus, by way of illustration, I have found that a rotary unit of approximately 5 and ½ feet in diameter filled with a layer of bark strips to a depth of 3 inches will rotate at an approximate rate of 60 r.p.m. in response to a circulation rate through the pump 30 of 20 gallons per minute. I have further determined that this rate of rotation is primarily due to the cooperation of the added weight of the liquid at the point 80 plus the tilt of the unit rather than any reaction effect achieved through impingement of the liquid on the surface of the bark at the point 80.

As a result of the operation of the unit, as above described, liquid circulated onto the bark fibers retained within the rotary distribution unit 60 slowly penetrates through the mass of fibers to the perforated bottom 74. This penetration of liquid is consequently quite uniform across the mass of bark fibers with the result that the liquid discharged through the perforated bottom of the unit falls in a steady uniform pattern which is very similar to rainfall. The ultimate effect is to uniformly distribute the circulating liquid over the hanging fiber section without tendency towards uneven circulation or splashing. Since, at normal temperatures and pressures the amount of oxygen absorbed by the descending liquid is a function of the area of liquid-gas interface and time of contact, conditions are presented by the uniform circulation over the hanging fiber 16 which greatly encourage the absorption of oxygen into the descending films of liquid. As pointed out in my Patent 3,238,124, the uniform circulation of liquid over the hanging fiber section is essential to an effective reduction of the biological oxygen demand (BOD) of circulating waste liquids. I have consequently found that the more uniform distribution of liquid provided by the apparatus of the present invention permits a substantial improvement in the overall effectiveness of my system for treating waste liquids, generally providing an increase in treating efficiency in excess of about 25%.

The effectiveness of my improved liquid distribution mechanism is best described by reference to the treatment of a particular waste liquid such as raw sewage, canning waste, or like material contaminated with organic colloidal solids. The contaminated liquid containing both colloidal and gross solids enters the system through the conduit 20 and by overflow of the container 18 mixes with the body of liquid 24 in the reservoir 10. In a process as carried out in my Patent 3,238,124, relatively short bark fibers in the body of liquid 24 attract colloidal solids in the entering liquid causing the solids to adhere to the fibers thereby effectively separating the solids. The treated liquid then passes through the perforated bottom support 38 and is thereafter circulated by the pump 30 through the discharge leg 34 and the discharge outlet 78 onto the upper surface of the rotary distribution unit 60. There the circulated liquid penetrates slowly through the layer of bark fibers 76, and at the same time causes the unit 60 to rotate about its tilt axis on the stub shaft 64. As the liquid penetrates through the strips of bark fibers 76, it is effectively aerated so as to partially reduce the BOD of the liquid through absorption of oxygen. The slow trickling of the liquid through the layer of fibers makes possible a rapid effective distribution of the liquid without any tendency towards splashing or surging, as is frequently encountered with use of discharge orifices. In addition, the open porous nature of the expanded metal bottom 74 virtually eliminates any tendency towards clogging of the system through formation of slime. In this regard, I have found that the individual dimensions of the openings in the bottom 74 should be within the range of from ½ to 2 inches to provide effective distribution without tendency towards plugging of the bottom through formation of slime, while eliminating splashing or surging through orifice effect. The result therefore is to obtain a uniform even fall of the liquid discharged from the rotary unit 60 onto the hanging fiber section 16. The clarified liquid now descends through the hanging fibers 40, as thin films, where it absorbs oxygen. The oxygen rich descending films of liquid then return to the fiber containing reservoir 10 where the microbiological community uses the oxygen while consuming the wastes which have been held in the fibers. This clarified liquid then returns to the distribution unit 60, in a repetition of the cycle. Clarified liquid is simultaneously discharged from the system in continuous fashion, through the discharge outlet 84.

From the foregoing, it should be apparent that the present invention provides a number of advantages which used in conjunction with a waste liquid treating system of the type described. Specifically, it provides a means to uniformly distribute liquids over an area of appreciable size and dimension without splashing or surging, while simultaneously providing an effective aeration of the circulating clarified liquid. The system thus provides a distribution unit which effectively resists sliming and plugging and insures a continuous distribution of liquid despite variations in the rate of liquid feed. The rotary distribution unit of the invention is also self-operating in the sense that it rotates in response to the flow of liquid through the unit without the need of any independent means to effect rotation.

I claim:

1. In apparatus for treating liquid wastes employing a hanging fiber section, means to uniformly and continuously distribute liquid through said hanging fiber section comprising a rotary distribution member, said rotary distribution member having a perforated substantially planar supporting surface, means mounting said rotary distribution member for rotation about a tilt axis so that a portion thereof is always higher than remaining portions of the rotary member, a plurality of fibers disposed on the perforated surface of said rotary distribution member, and means circulating liquid to a point adjacent said higher portion of the rotary distribution member, whereby said rotary member is caused to rotate and distribute said liquid as a uniform rain of liquid through said perforated supporting surface.

2. Apparatus as in claim 1 wherein said tilt axis is substantially perpendicular to the plane of said perforated supporting surface.

3. Apparatus as in claim 1 wherein said fibers are redwood bark fibers.

4. Apparatus as in claim 3 wherein said redwood bark fibers have a thickness no greater than about 1 millimeter and a length of approximately 1 centimeter.

References Cited

UNITED STATES PATENTS

| 798,908 | 9/1905 | Kremer | 210 |
| 1,696,846 | 12/1928 | Imhoff | 210—75 |
| 1,979,500 | 11/1934 | Sniffin | 209—350 X |
| 3,192,154 | 6/1965 | Burton | 210—17 X |
| 3,238,124 | 3/1966 | Burton | 210—17 X |

MICHAEL E. ROGERS, *Primary Examiner.*